No. 805,512. PATENTED NOV. 28, 1905.
T. R. ALMOND.
REACTION ENGINE.
APPLICATION FILED JULY 18, 1904.

6 SHEETS—SHEET 1.

Witnesses
Inventor
Thomas R. Almond,
By his Attorneys

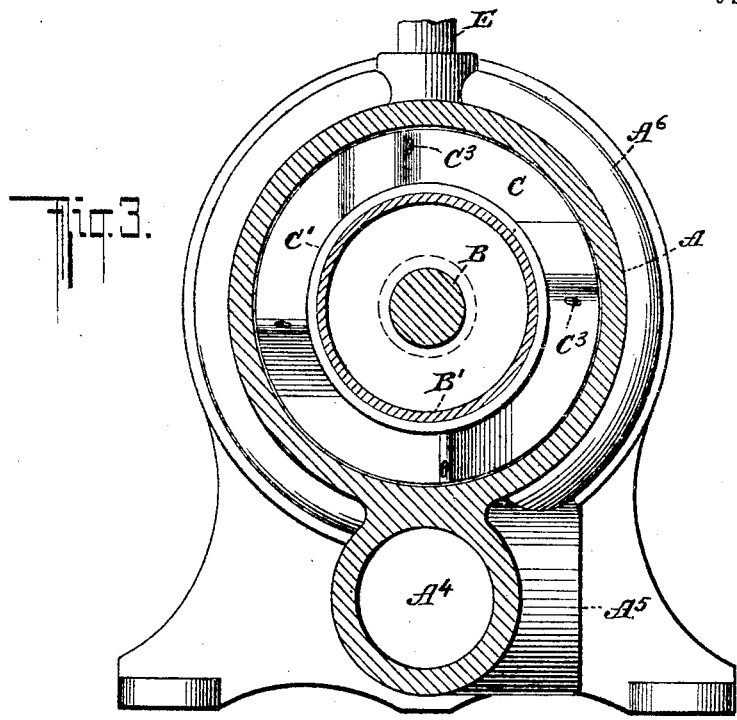
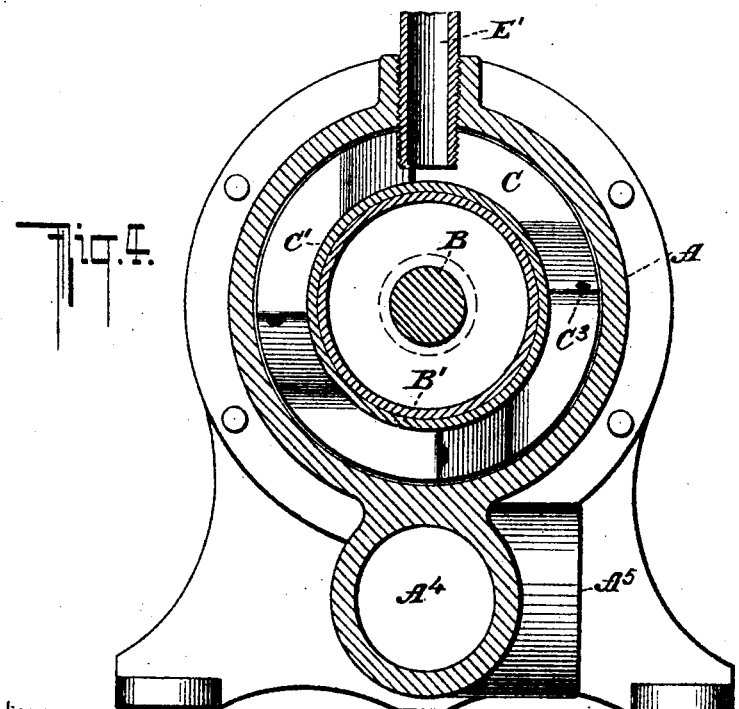

No. 805,512. PATENTED NOV. 28, 1905.
T. R. ALMOND.
REACTION ENGINE.
APPLICATION FILED JULY 18, 1904.
6 SHEETS—SHEET 3.
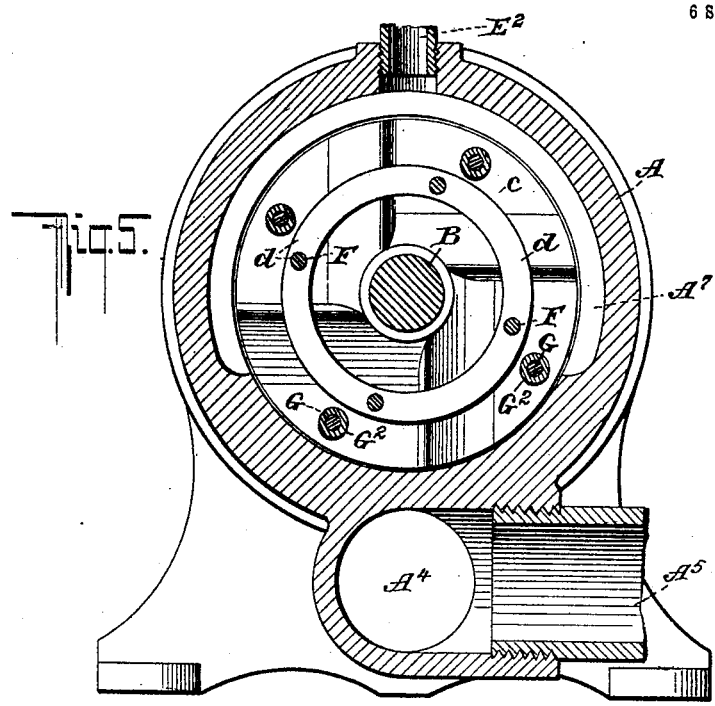
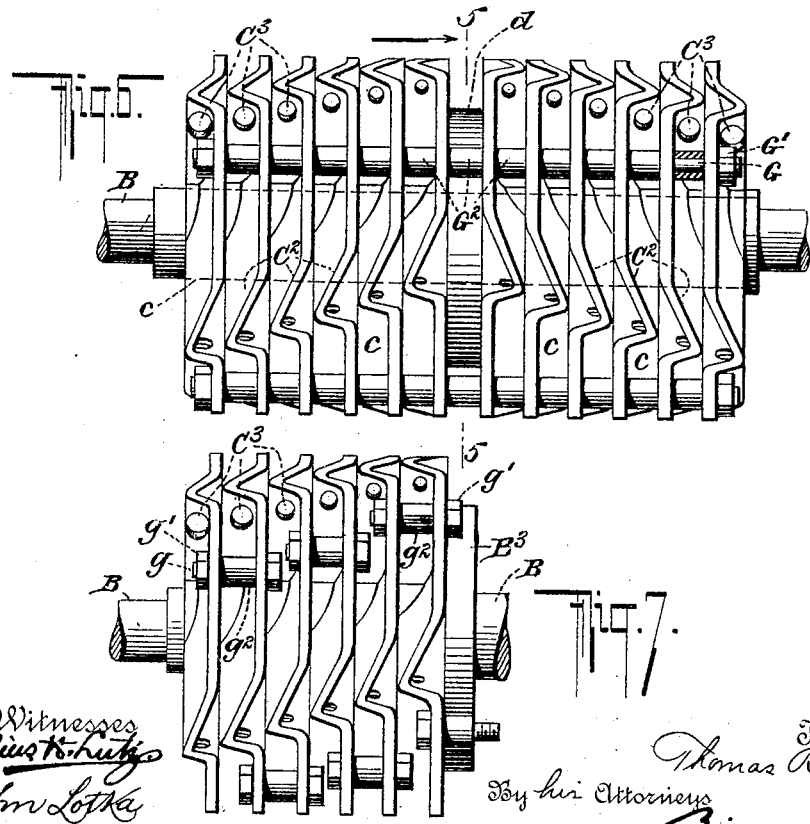

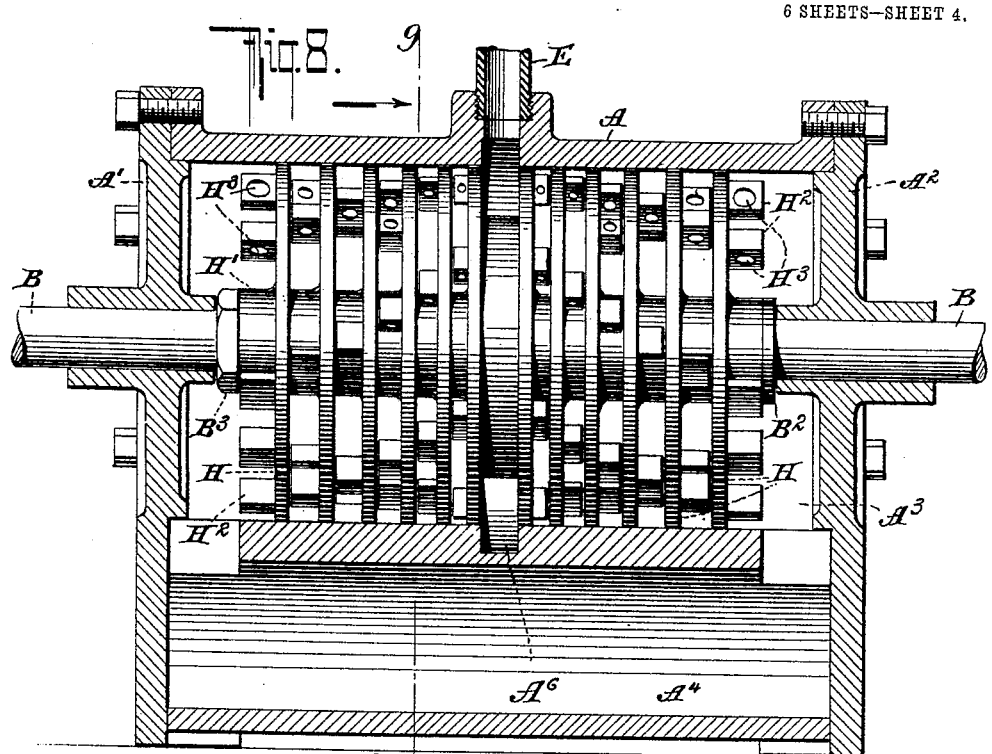
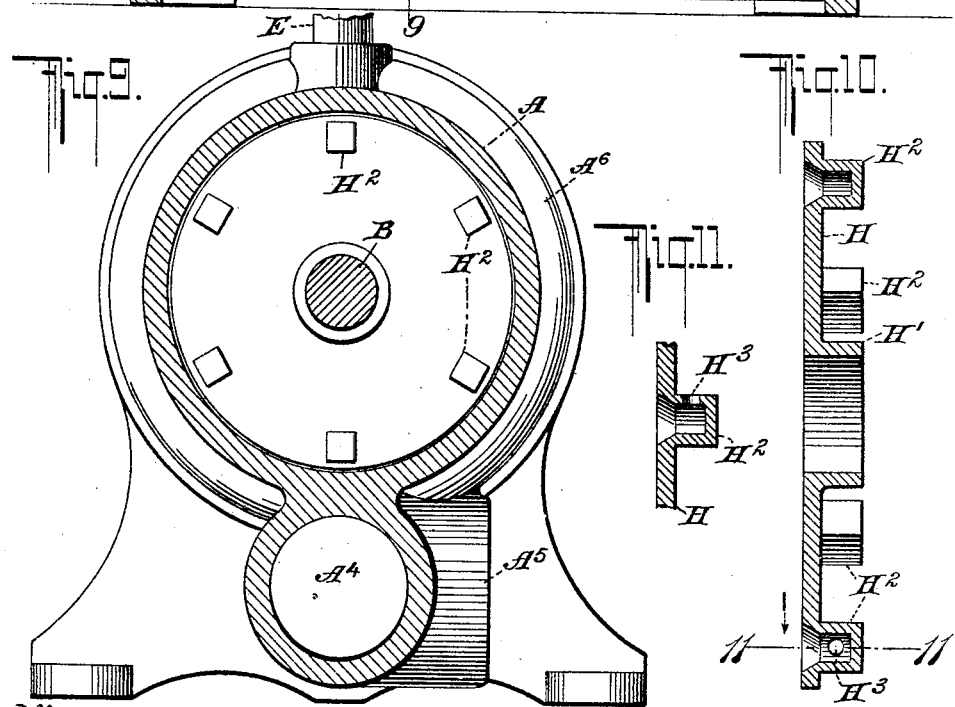

No. 805,512. PATENTED NOV. 28, 1905.
T. R. ALMOND.
REACTION ENGINE.
APPLICATION FILED JULY 18, 1904.
6 SHEETS—SHEET 5.
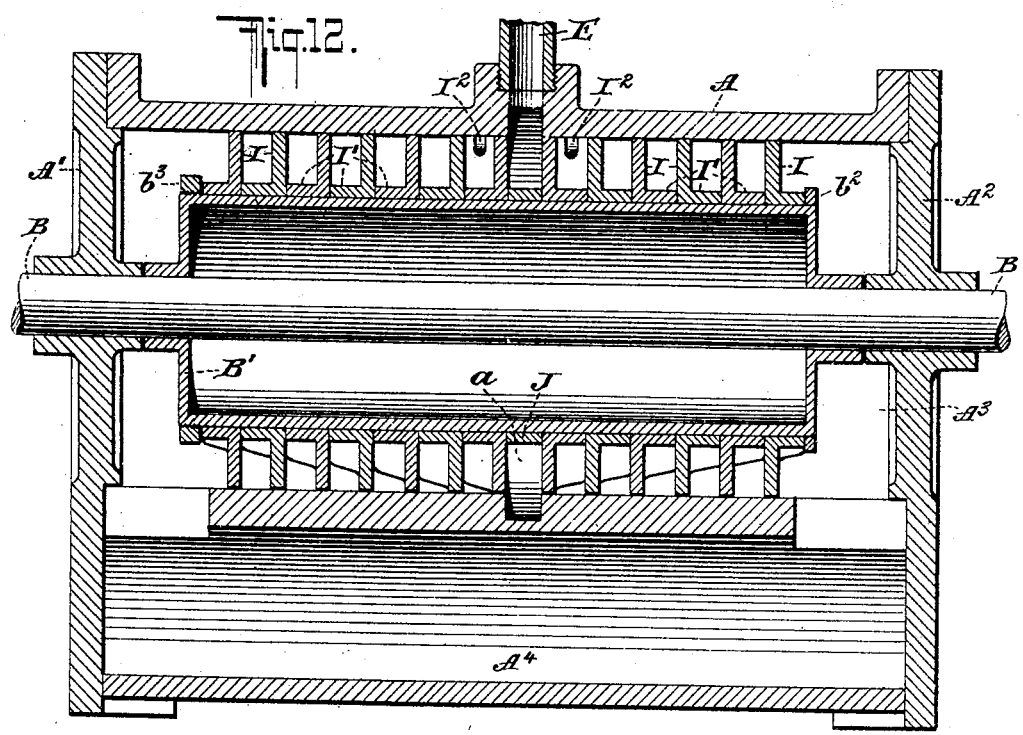
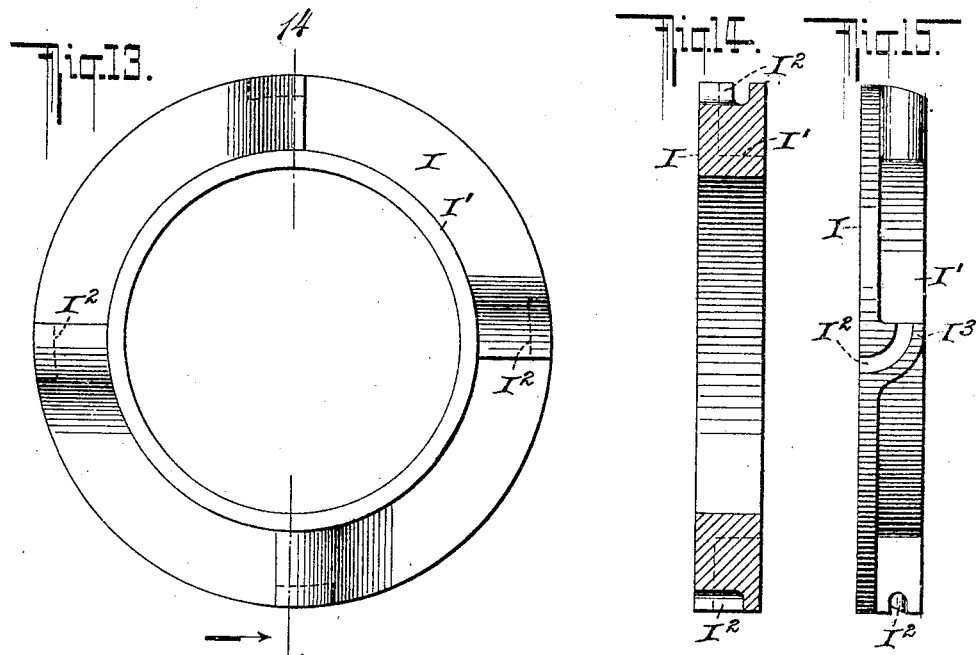

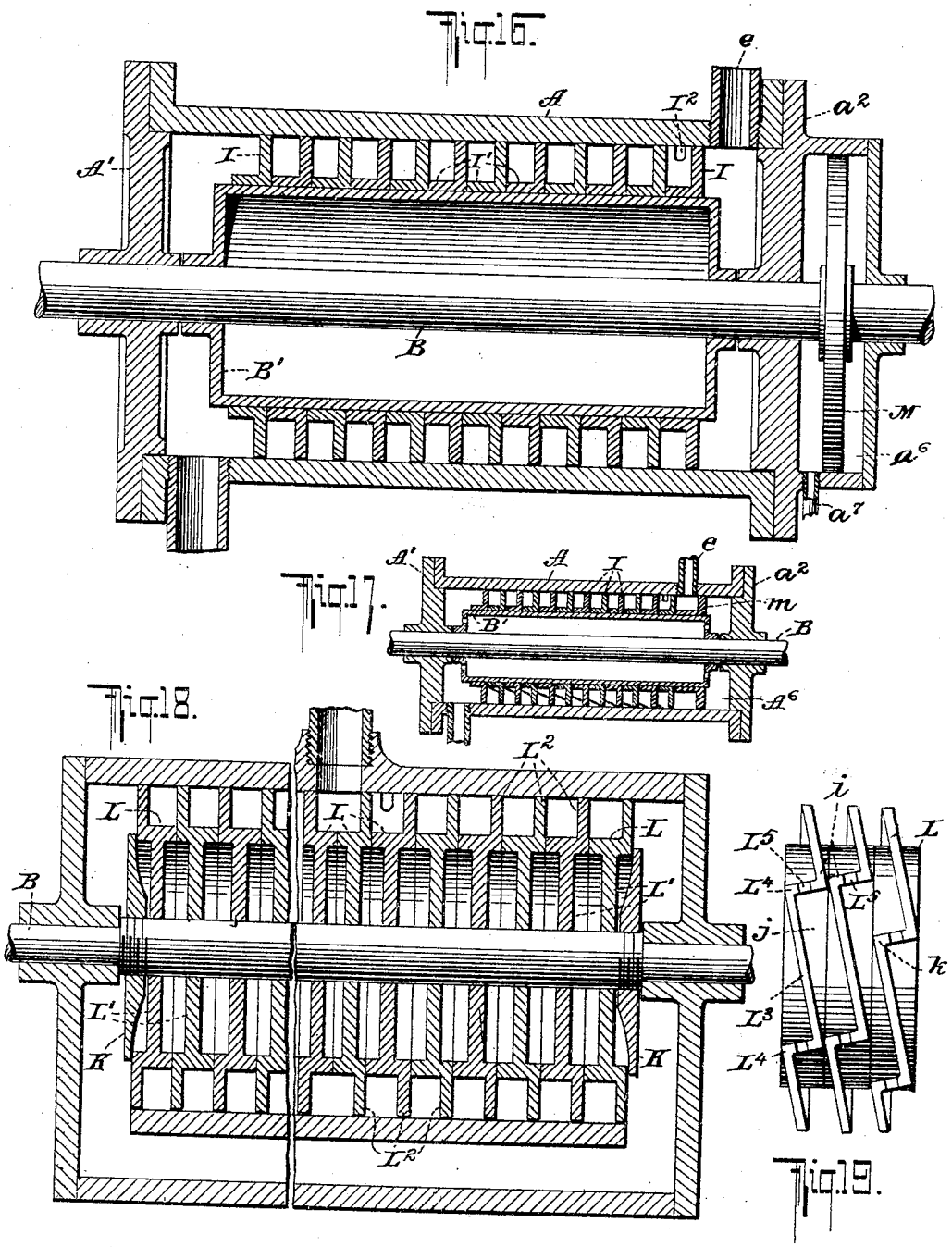

UNITED STATES PATENT OFFICE.

THOMAS R. ALMOND, OF YONKERS, NEW YORK.

REACTION-ENGINE.

No. 805,512.      Specification of Letters Patent.      Patented Nov. 28, 1905.

Application filed July 18, 1904. Serial No. 216,950.

*To all whom it may concern:*

Be it known that I, THOMAS R. ALMOND, a citizen of the United States, residing in Dunwoodie, Yonkers, Westchester county, State of New York, have invented certain new and useful Improvements in Reaction-Engines, of which the following is a specification.

My invention relates to engines in which an expansible medium, such as steam, is introduced under pressure and discharged from a rotary member in such a direction as to cause said member by reaction to rotate in the opposite direction.

My present invention has for its object to provide a very simple reaction-engine of the above-indicated type consisting practically of only two parts and having provision for the gradual expansion of the driving medium in a series of steps or stages, so as to progressively reduce the pressure to substantially atmospheric pressure and to utilize the energy of the driving medium to the fullest extent, while reducing the speed of the rotary member to a number of revolutions sufficiently low for satisfactory practical results. For this purpose I construct my improved engine in accordance with the principles hereinafter set forth, the novel features of my invention being particularly pointed out in the appended claims.

Reference is to be had to the accompanying drawings, in which—

Figure 1:
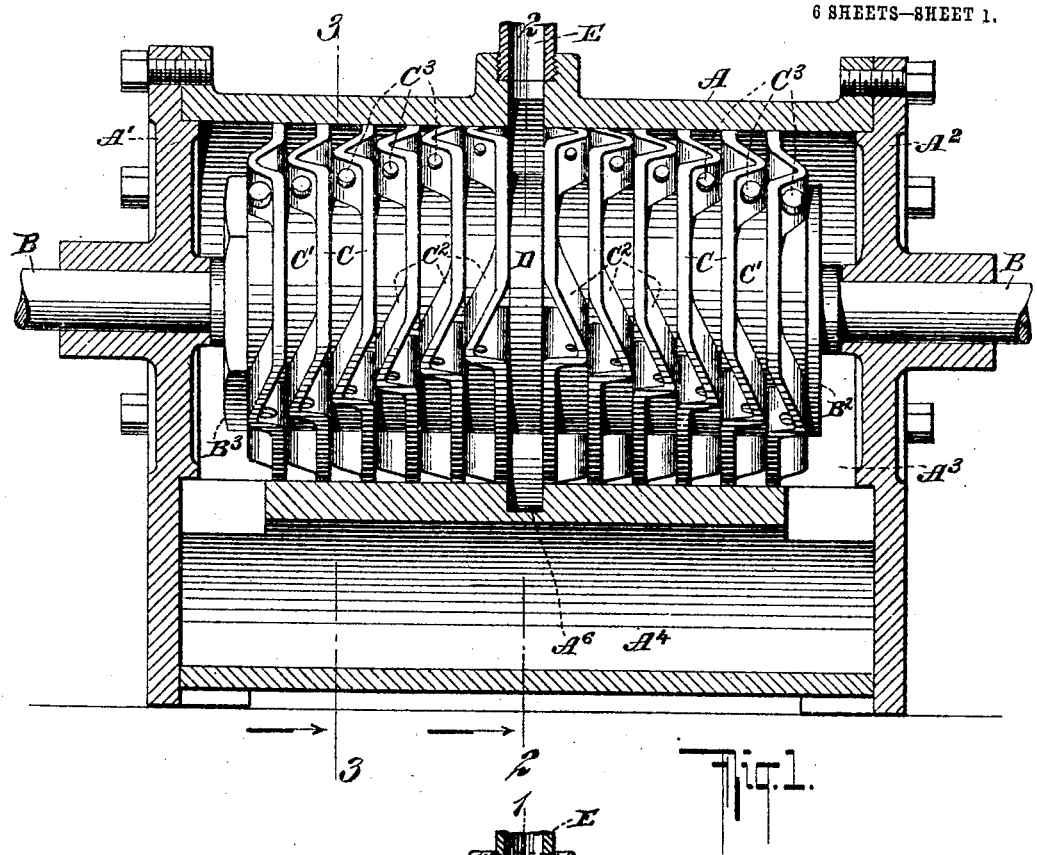
Figure 2:
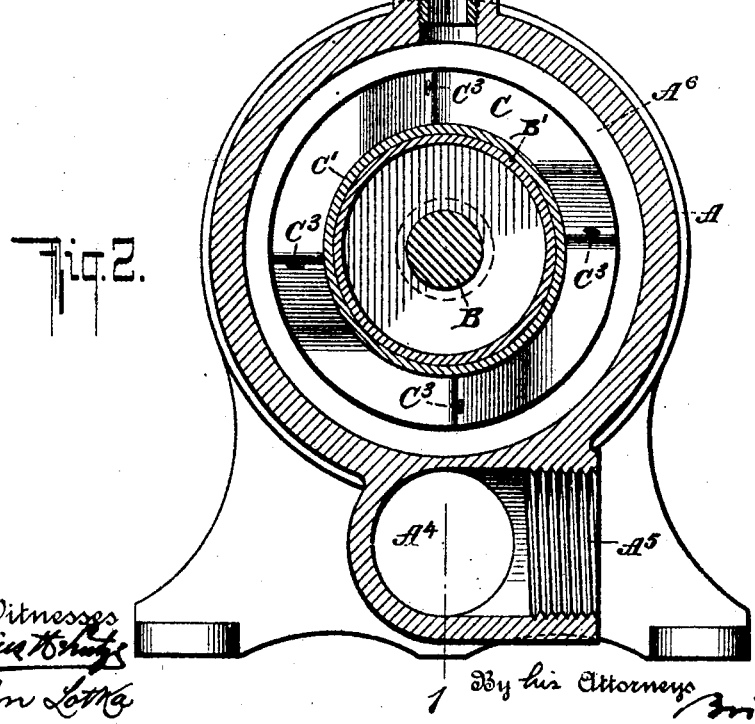

Figure 1 is a longitudinal section on line 1 1 of Fig. 2, showing an engine embodying my invention. Fig. 2 is a cross-section on line 2 2 of Fig. 1. Fig. 3 is a cross-section on line 3 3 of Fig. 1. Fig. 4 is a central cross-section of another form of my invention. Fig. 5 is a central cross-section of still another form of my invention. Fig. 6 is a side view of the rotary member of the engine. Fig. 7 is a side view of another form of the rotary member. Fig. 8 is a longitudinal section of a further form of construction. Fig. 9 is a cross-section on line 9 9 of Fig. 8. Fig. 10 is a cross-section of one of the plates shown in Figs. 8 and 9. Fig. 11 is a section on line 11 11 of Fig. 10. Fig. 12 is a longitudinal section of a further form of my invention. Fig. 13 is a face view of the plate employed in Fig. 12. Fig. 14 is a section on line 14 14 of Fig. 13. Fig. 15 is a side view of said plate. Figs. 16, 17, and 18 are longitudinal sections of further forms of construction; and Fig. 19 is a detail side elevation showing a somewhat different form of plate for the rotary member.

As shown in Figs. 1, 2, and 3, the engine comprises a stationary member or casing and a rotary member journaled in said stationary member. This stationary member may be provided with a substantially cylindrical body A and end members or heads $A'$ $A^2$, bolted or otherwise secured to said body. A cylindrical chamber $A^3$ is formed in said stationary member, said chamber being adapted to receive the rotary member the shaft of which, B, is journaled in the heads $A'$ $A^2$. Upon said shaft is secured a drum $B'$, so as to leave an annular chamber between the cylindrical body A and said drum. Upon the drum is mounted a series of reaction members or plates C, two sets of such reaction members being shown, one at each side of the center. These reaction members may be held on the drum in any suitable manner—as, for instance, by causing the said members to abut against a flange $B^2$ of the drum and screwing a nut $B^3$ against the other end of the series. A central spacing-collar D separates the two sets of reaction members, and each of said members is provided with a cylindrical flange $C'$, which fits upon the drum $B'$ and serves to space the reaction member from its neighbor. Each reaction member has its outer edge or periphery in a cylindrical surface, so that in rotation it will form a practically steam-tight fit with the inner surface of the body A. Each reaction member further has a series of lateral bends $C^2$ of approximately triangular shape when viewed from the edge, and preferably one wall of this bent portion extends approximately at a right angle to the plane of rotation. In this wall I provide an opening $C^3$, which extends about tangentially to the path of rotation and forms a passage through which steam may pass from one compartment or chamber to the next, it being understood that the disks or plates C divide the casing into a series of compartments.

I desire it to be clearly understood that the special construction of the reaction members or plates is only one of the many ways which may be adopted for affording a communication from one chamber to the next at the outer portions of such chambers. The inlet for the steam or other driving medium is indicated at E and is located centrally—that is, between the two sets of reaction members. The steam therefore enters the feed-chamber surrounding the collar D and passes to the two adjacent chambers by means of the communicating passages $C^3$. This feed-chamber I have termed a "central" chamber, which means that it is located between the two sets of reaction members, and it is not necessary that the chamber should be mathematically central. Fig. 1 shows one form of my invention in which the sizes or areas of the apertures $C^3$ increase progressively from the inlet toward the outlet. Thus as the steam passes from one chamber to the next a reduction of pressure will take place, and by a proper choice of dimensions the reduction of pressure may be so graded that the pressure in the last chamber will be still somewhat above atmospheric pressure. It will be understood that with a proper construction of the parts the reduction of pressure may be carried out evenly from chamber to chamber—that is, the construction may be such that each chamber will be filled with steam having a pressure of, say, ten pounds above the pressure of the steam in the next chamber into which the steam escapes. A compound action is thus obtained, and the engine will deliver at the shaft B the sum total of reaction energies exerted at the individual communicating passages $C^3$. The exhaust passes from the ends of the casing either directly to the atmosphere or through a special exhaust-conduit $A^4$, having an outlet $A^5$. The central admission of the driving medium is of advantage in the following respects: First, owing to the employment of two series of reaction members at opposite sides of the steam-inlet all end thrust is eliminated; second, the steam being hottest at the inlet and coolest at the exhaust and the bearings being located adjacent to the exhaust it will be understood that with the central location of a steam-inlet there will be but little heating effect on the bearings; third, the structure is duplicated with the employment of a single feed-chamber, thus simplifying the construction and making it very compact.

The peripheral introduction of the driving medium presents the following advantages: First, the freedom with which the steam may be supplied to the feed-chamber in large amounts, as the area of the inlet E and the size of the feed-chamber may be increased to any required extent; second, the possibility of keeping the diameter of the shaft and bearings down to the smallest practicable size; third, the shaft and bearings are removed as far as possible from the influence of heat due to high-pressure steam.

The provision of the drum B' while not absolutely necessary is of advantage in that it provides a firm support for the reaction members at points sufficiently close to their outer edges to prevent any lateral deflection of said reaction members at their outer edges, which deflection might cause the plates to bind. It will be seen that the rotary member forms practically a single piece, and, in fact, it is possible to cast such rotary member of a single piece.

An important feature of my invention lies in the comparatively small difference of pressure between adjacent chambers and the relatively small speed of rotation which is thus secured.

As illustrated in Figs. 1 and 2, the casing or body A has a continuous circumferential groove $A^6$ communicating with the inlet E and with the central chamber of the rotary member. Thus a quick distribution of the steam to all parts of the central chamber is assured.

The construction shown in Fig. 4 differs from that described above by the omission of the circumferential groove $A^6$ and by the extension of the inlet E' into the central chamber of the rotary member. In Fig. 5 the body A has a circumferential groove $A^7$ connected with the inlet $E^2$; but said groove does not extend continuously around the inner surface of the body A.

Various constructions may be employed for assembling the reaction-disks, which form part of the rotary member, and securing them to the shaft. As has been stated above, the entire rotary member may be cast of one piece, if desired, or, as has been described with reference to Figs. 1, 2, and 3, the reaction-disks may be annular and mounted upon a drum surrounding the shaft. As shown in Figs. 5, 6, and 7, the disks $c$ are mounted directly upon the shaft and suitably secured thereto, and, according to Figs. 5 and 6, the two central disks are held to the spacing-sleeve $d$ by rivets F, and the entire series of disks is held together by bolts G and nuts G' in conjunction with spacing-collars $G^2$. These disks are provided with laterally-bent portions provided with apertures increasing in size from the inlet toward the outlet in the same manner as described with reference to Figs. 1, 2, and 3. Instead of increasing the apertures in size they may be increased in number, it being understood that in either event the total area of the apertures or passages from one chamber to the next increases from the inlet toward the outlet. In Fig. 7 one of the end rings is secured to a flange $B^3$ upon the shaft B, and each two adjacent disks are connected, by means of bolts and nuts $g$ $g'$, with spacing-collars $g^2$.

In the construction illustrated by Figs. 8 to 11 the stationary part or casing is of the same construction as in Figs. 1 to 3. The rotary member comprises the shaft B, having at one end a shoulder $B^2$ and at the other end a nut $B^3$, adapted to press together the hubs H' of disks H, forming rotary reaction members and at the same time partitions to divide the chamber of the casing into a series of compartments. These compartments may increase in size from the inlet toward the outlet, as shown in Fig. 8, and the proper spacing of the reaction-disks is obtained by using hubs H' of different lengths and also at the peripheral portions by providing the disks with projections $H^2$, arranged for engagement with the adjacent disks. Each of these projections is provided with an aperture $H^3$, forming a passage by means of which one chamber communicates with the next, and these passages are so directed at their discharge ends as to produce rotation by a reaction effect. The lugs or projections $H^2$ prevent lateral bending, distortion, or deflection of the disks at their outer portions, which might cause binding at the periphery.

In Figs. 12 to 15 the casing is of the same construction as in Fig. 1, having a body A, heads A' $A^2$, forming a cylindrical chamber $A^3$, below which is the exhaust-chamber $A^4$ and into which leads the inlet E. The shaft B, journaled in the heads A' $A^2$, carries the drum B', upon which are secured, by screw-collars $d^2$ $d^3$, two series of reaction members I, each having a ring-flange I' in engagement with the drum B'. A collar J separates the two innermost reaction members, and thus determines the size of the feed-chamber $a$. The communicating passages $I^2$, leading from one chamber to the next, are in this form of my invention made at the edge or periphery of the reaction members, which preferably are provided at the required points with lateral projections $I^3$, which may also serve to brace the peripheral portions of the reaction members by engaging the adjacent member. The discharge portions of these passages are so directed as to produce rotation by the reaction effected.

The form of construction illustrated by Fig. 16 is very similar to that shown in Fig. 12. Hence I will describe it only so far as it differs therefrom. The inlet $e$ is at one end of the casing instead of being centrally arranged, and the steam travels to the opposite end from which the exhaust escapes. It will be seen that with this construction the steam has a tendency to exert an end thrust on the shaft. To diminish or entirely counterbalance this end thrust, I connect with the shaft a balance-plate exposed to pressure acting in a direction opposite to that which would produce the end thrust. In the particular construction illustrated by Fig. 16 the shaft carries a balance-plate M, mounted to rotate therewith and having a running fit in a cylindrical chamber $a^6$, which may be formed upon or in the cover $a^2$. This chamber has an inlet $a^7$ for the introduction of suitable medium to produce the requisite balancing pressure.

In Fig. 17 I have illustrated diagrammatically a construction similar to that represented in Fig. 16, except that the balance-plate $m$ is in this case shown within the main casing, being located at the opposite side of the inlet $e$ to the set of reaction members. The chamber $A^6$ between the said balance-plate $m$ and the head $a^2$ of the casing should have a suitable opening and is preferably connected with the exhaust, which may be done by having the ends of the drum perforated, as shown.

In Figs. 18 and 19 I have illustrated a construction similar in general arrangement to that shown in Fig. 12. The difference is in the construction of the reaction members, and I shall therefore confine my description of Figs. 18 and 19 to an explanation of this feature. The reaction members are held on the shaft by means of end plates K, screwing on the shaft. Each reaction member has a cylindrical portion L, adapted to abut against the corresponding portion of the adjacent member, these flanges together forming substantially the equivalent of a continuous drum. Each of the reaction members further has a central portion L' extending into contact with the shaft B. This central portion may be a continuous web or a spider. Finally, the outer operative portions $L^2$ of the reaction members, which have a running fit with the inner surface of the cylindrical body A, are constructed with bends consisting of two portions $L^3$ $L^4$, arranged practically at a right angle to each other, and the shorter one of them is perpendicular to the plane of rotation, or approximately so. The communicating apertures $L^5$, through which the steam passes from one chamber to the next, I prefer in this case to arrange parallel with the planes of the portions $L^4$, so that the steam will not be projected against the side surfaces of said portions, but will travel along them with the least possible amount of friction. The portions $L^3$ of adjacent reaction members may be arranged to register as shown at $i$ in Fig. 19, in which case the entire rotary member is subdivided into a series of relatively small chambers $j$, which may be termed "segmental," as they do not extend entirely around the shaft. If preferred, the adjacent reaction members may be arranged in staggered positions, as shown at $k$ in Fig. 18, in which case a continuous chamber is formed around the flange L between each two reaction members. In either event the travel of the steam will be practically in a continuous spiral path extending around the rotary member with a substantially constant angle or pitch.

While I have shown only horizontal arrangements of my reaction-engine, I desire it to be clearly understood that the shaft may be disposed vertically or at any angle to the horizontal and also that other modifications may be made without departing from the nature of my invention.

What I claim as new, and desire to secure by Letters Patent, is—

1. A reaction-engine comprising a casing provided with a continuous circumferential groove or chamber upon its inner surface and an inlet for the driving medium connected with said groove, in combination with a rotary member having an inlet-chamber communicating with said groove, and provided with a series of reaction members through which the driving medium is adapted to pass successively on its way from said inlet-chamber to the exhaust.

2. A reaction-engine having a rotary member with a series of reaction members, the edges of which lie in a surface generated by rotation, and a casing shaped to lie close to the paths of said edges.

3. A reaction-engine having a cylindrical casing provided with an inlet and an outlet for the driving medium, and a rotary member having reaction members the edges of which form a fit with the inner surface of the casing.

4. A reaction-engine having a cylindrical casing with a central inlet and end outlets for the driving medium, in combination with a rotary member having a double series of reaction members or plates having a peripheral fit against the inner surface of the casing and forming a series of chambers through which the driving medium is adapted to travel expansively, with a reaction effect, from the inlet to each of the outlets.

5. A reaction-engine having a casing with a peripheral inlet for the driving medium, and a series of rotary reaction members arranged to be driven by said medium.

6. A reaction-engine comprising a casing having an inlet for the driving medium, two sets of rotary reaction members having communicating passages, and a feed-chamber connected with said inlet and located between the two sets of reaction members.

7. A reaction-engine comprising a casing and a series of members mounted to rotate in unison therein and forming partitions to divide the interior of said casing into a series of chambers, said members having their peripheral portions spaced from each other, and placed close to the inner surface of the casing, and being provided with passages leading from one chamber to the next, the discharge ends of such passages being directed to rotate said members by a reaction effect.

8. A reaction-engine comprising a casing and a series of members mounted to rotate in unison therein and forming partitions to divide the interior of said casing into a series of chambers, said members having their peripheral portions spaced from each other and placed close to the inner surface of the casing, and being provided with passages leading from one chamber to the next, the discharge ends of such passages being directed to rotate said members by a reaction effect, and the total area of such communicating passages increasing from chamber to chamber toward the exhaust.

9. A reaction-engine comprising a casing and a rotary member mounted within said casing and having its periphery close to the inner surface of the casing, so as to separate two chambers within the casing, said rotary member being provided with reaction-passages extending from one of its end faces to the other and connecting said two chambers so as to give the driving medium a motion which is partly lengthwise of the axis of rotation.

10. A reaction-engine comprising a casing having two outlets and an inlet located between said outlets, and a rotary member having a series of reaction members, the peripheries of which are close to the inner surface of the casing, said reaction members dividing the interior of the casing into a central chamber communicating with the inlet, and expansion-chambers located at both sides of said central chamber, each of the reaction members having passages which lead from one chamber to another and all of which have their discharge ends directed to rotate said members in the same direction by a reaction effect.

11. A reaction-engine comprising a casing and a rotary member located therein and provided with reaction members located at varying distances from each other and extending close to the inner surface of the casing with their peripheral portions, so as to subdivide the interior of the casing into a series of chambers of different sizes, said reaction members being provided with passages extending therethrough from one chamber to another, and having their discharge ends directed to rotate said members with a reaction effect.

In testimony whereof I have hereunto set my hand in the presence of two subscribing witnesses.

THOMAS R. ALMOND.

Witnesses:
  JOHN LOTKA,
  JOHN A. KEHLENBECK.